(12) United States Patent
Yang et al.

(10) Patent No.: US 9,252,437 B2
(45) Date of Patent: Feb. 2, 2016

(54) APPARATUS FOR PREVENTING OVER-COOLING OF FUEL CELL

(71) Applicant: Hyundai Motor Company, Seoul (KR)

(72) Inventors: Yoo Chang Yang, Gunpo-si (KR); Sang Mun Jin, Yongin-si (KR); Sung Ho Lee, Seongnam-si (KR)

(73) Assignee: Hyundia Motor Company, Seoul (KR)

( * ) Notice: Subject to any disclaimer, the term of this patent is extended or adjusted under 35 U.S.C. 154(b) by 192 days.

(21) Appl. No.: 13/971,437

(22) Filed: Aug. 20, 2013

(65) Prior Publication Data
US 2014/0356749 A1   Dec. 4, 2014

(30) Foreign Application Priority Data
May 31, 2013 (KR) ........................ 10-2013-0062270

(51) Int. Cl.
*H01M 8/02* (2006.01)
*H01M 8/04* (2006.01)
*H01M 8/24* (2006.01)

(52) U.S. Cl.
CPC ........ *H01M 8/04074* (2013.01); *H01M 8/0267* (2013.01); *H01M 8/04029* (2013.01); *H01M 8/2465* (2013.01); *H01M 2250/20* (2013.01); *Y02E 60/50* (2013.01); *Y02T 90/32* (2013.01)

(58) Field of Classification Search
CPC ..................... H01M 8/04029; H01M 8/04074; H01M 8/241; H01M 8/2485; H01M 2250/20
See application file for complete search history.

(56) References Cited

U.S. PATENT DOCUMENTS

| | | | |
|---|---|---|---|
| 5,629,104 A * | 5/1997 | Crawford et al. | 429/457 |
| 2002/0106543 A1* | 8/2002 | Sonntag et al. | 429/24 |
| 2004/0142223 A1* | 7/2004 | Allen et al. | 429/34 |
| 2007/0200277 A1 | 8/2007 | Spencer | |
| 2010/0173218 A1* | 7/2010 | Kozu et al. | 429/456 |
| 2011/0091786 A1* | 4/2011 | Matsumoto et al. | 429/469 |
| 2012/0045708 A1* | 2/2012 | Nango et al. | 429/457 |

FOREIGN PATENT DOCUMENTS

| | | |
|---|---|---|
| JP | 2005-243286 A | 9/2005 |
| JP | 2007-250338 A | 9/2007 |
| JP | 2007-280896 A | 10/2007 |
| JP | 2008-053060 A | 3/2008 |
| JP | 2008-130350 A | 6/2008 |
| KR | 10-2009-0015272 A | 2/2009 |
| KR | 10-2010-0111972 A | 10/2010 |

* cited by examiner

*Primary Examiner* — Kenneth Douyette
(74) *Attorney, Agent, or Firm* — Mintz Levin Cohn Ferris Glovsky and Popeo, P.C.; Peter F. Corless

(57) ABSTRACT

An apparatus preventing over-cooling of a fuel cell is provided that includes a cooling fluid manifold which is mounted to a stack of the fuel cell and through which cooling fluid flows therethrough. End plates are arranged on both ends of the stack of a fuel cell, and at least one protrusion is provided on one surface of each of the end plates. The at least one protrusion is disposed inside a cooling fluid manifold to reduce the flow amount of the cooling fluid which flows in and out between the separating plates through the cooling fluid manifold.

14 Claims, 3 Drawing Sheets

US 9,252,437 B2

APPARATUS FOR PREVENTING OVER-COOLING OF FUEL CELL

CROSS-REFERENCE TO RELATED APPLICATION

This application claims under 35 U.S.C. §119(a) the benefit of Korean Patent Application No. 10-2013-0062270 filed on May 31, 2013, the entire contents of which are incorporated herein by reference.

BACKGROUND (a) Technical Field

The present disclosure relates to an apparatus for preventing over-cooling of a fuel cell, and more specifically, to an apparatus for preventing over-cooling of a fuel cell, in which a flow amount of cooling fluid participating in cooling of end cells is reduced through shape modifications of end plates, thereby preventing over-cooling of the end cell in order to avoid flooding of stacks of fuel cells.

(b) Background Art

Generally, a stack of a fuel cell for a vehicle is configured with a plurality of cells being connected in series wherein air, fuel (hydrogen) and cooling fluid are supplied and discharged at an end of the stack. As shown in FIG. 1, in the cell (power generating cell) an anode separating plate 1a and a cathode separating plate 1b are arranged at both sides of an Membrane Electrode Assembly (MEA) (power generating body) and Gas Diffusion Layers (GDLs) are bonded thereat. Additionally, a stack is formed with each unit cell being repeatedly stacked. Additionally, a flow channel 4 of cooling fluid, which is communicated with a cooling fluid manifold 3, is disposed at an interface between two adjacent cells. That is, the interface is disposed between the anode separating plate 1a and the cathode separating plate 1b, and thus, based on the power generating body MEA, about half of each plate thereof is effectively a cooling surface.

However, in case of an end cell facing an end plate 20, since the end cell 2 is disposed at an outermost region of the fuel cell, the cooling fluid for cooling the end cell is only cooled on one side, unlike other cells in the system which are cooled on both sides. As a result, this can cause a flooding phenomenon on a reaction surface of the end cell due to an excessive cooling of the end cell in comparison to the general power generating cells, and as a result the end cells become more deteriorated, compared to the general cells, as time passes.

Additionally, an end cell faces an end plate, additional heat is lost due to heat conduction into the air, even further adding to the problem of deterioration and flooding.

As a solution to this problem, a foaming structure has been added to the fuel cell system, this foaming structure is additionally provided in the vicinity of an inlet/outlet manifold of the cooling fluid in a separating plate. However, these foaming structures require piercing molds among molds for the separating plates used in a general cell and an end cell has to be prepared with two different specifications, and thus the production processes has to be performed separately thus making the manufacturing process more costly.

The invention disclosed in this background of the invention section is only for enhancement of understanding of the background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with prior art and it is an object of the present invention to provide an apparatus for preventing over-cooling of a fuel cell (particularly the end cells of the fuel cell stack), in which a flow amount of cooling fluid participating in cooling of end cells is reduced through shape modifications of end plates, thereby preventing over-cooling of the end cell in order to avoid flooding of stacks of fuel cells.

In order to achieve the object of the present invention, the present invention provides an apparatus for preventing over-cooling of a fuel cell, including: a cooling fluid manifold which is formed in the fuel cells of a stack of the fuel cell and through which cooling fluid flows therethrough. Also included are end plates that are arranged on both ends of the stack of a fuel cell. In each of these end plates at least one protrusion is provided on one surface of each of the end plates. Each of the at least one protrusions are disposed at the end of a cooling fluid manifold to reduce the flow amount of the cooling fluid which flows in and out between the separating plates through the cooling fluid manifold. These protrusions may be fitted to the inside of the cooling fluid manifold to block a portion of a flow channel of the cooling fluid that is formed between the separating plates.

More specifically, these protrusions in some exemplary embodiments of the present invention may be shaped to correspond to a section of the cooling fluid manifold. The protrusions may also be installed on at least one side of an inlet and an outlet of the cooling fluid manifold, and may be formed integrally with the end plate.

Additionally, in some exemplary embodiments of the present invention, the apparatus for preventing over-cooling of a fuel cell may further include a dummy cell not participating in power generation, which is arranged at a portion facing the end plate.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Hereinafter, an apparatus for preventing over-cooling of a fuel cell according to an exemplary embodiment of the present invention will be described, referring to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes all fuel cell vehicles including hybrid vehicles, electric fuel cell vehicles, plug-in hybrid fuel cell vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both fuel cell stack and electric-power.

Figure 1:
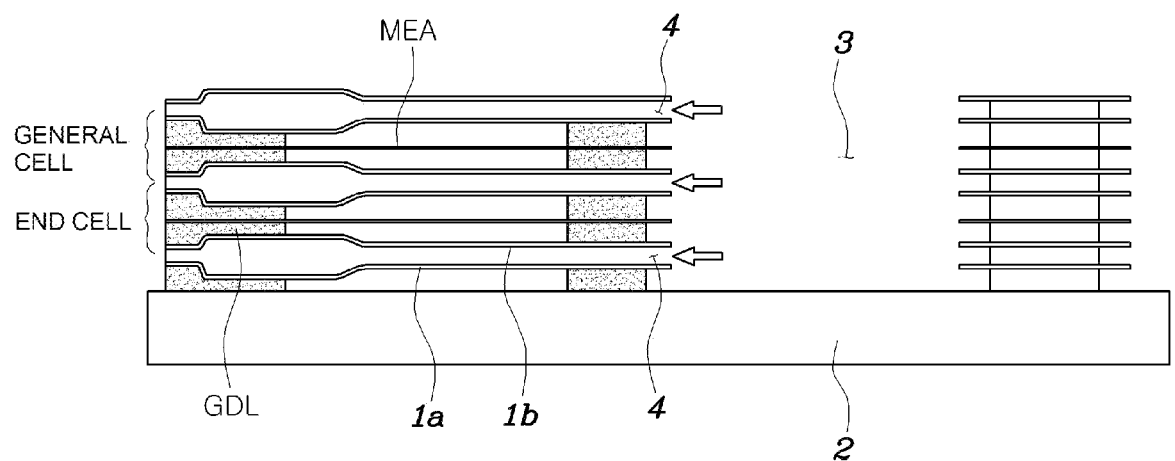
FIG. 1 is a view describing a flow of cooling fluid at a stack of a fuel cell according to a related art.
Figure 2:
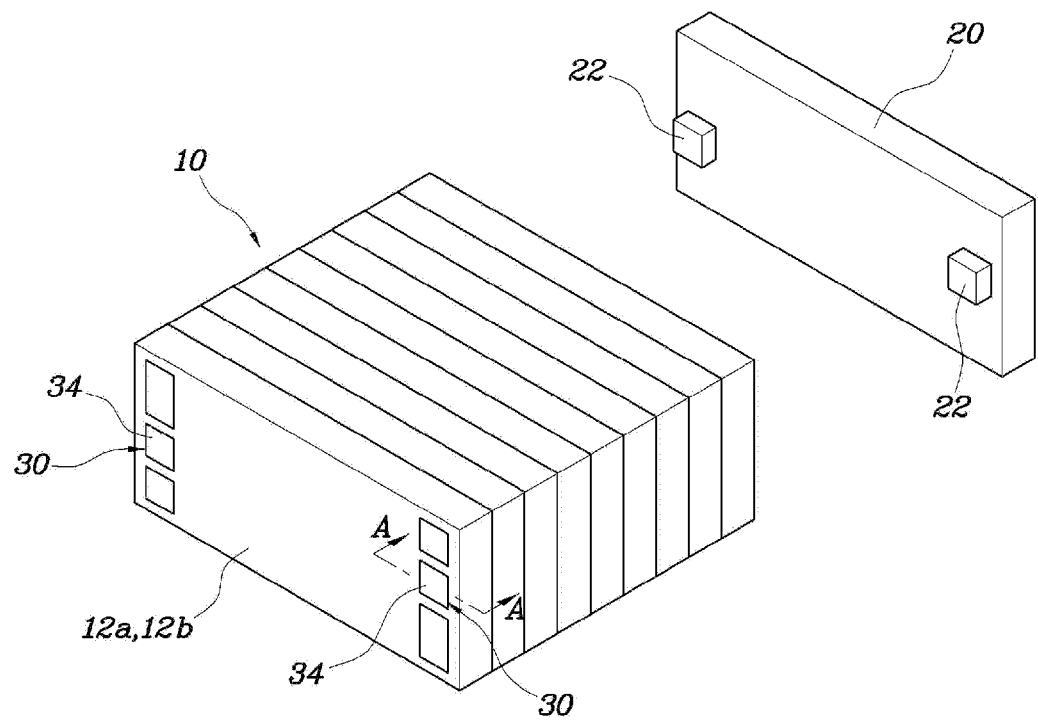
FIG. 2 is a view showing a protrusion arranged on an end plateau a stack of a fuel cell according to an exemplary embodiment of the present invention.
Figure 3:
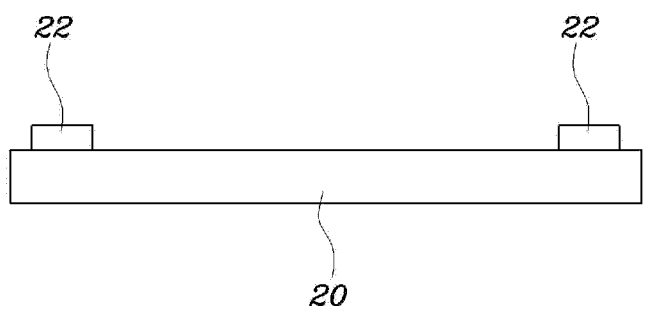
FIG. 3 is aside view showing an end plate of FIG. 2.
Figure 4:
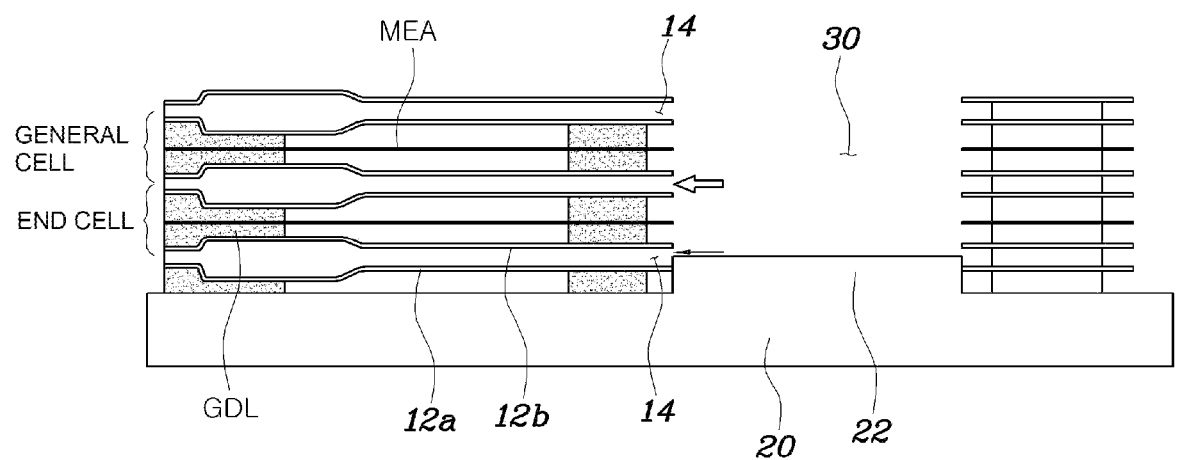
FIG. 4 is a sectional view taken along line A-A of FIG. 2 to describe a flow of cooling fluid by means of a protrusion at a stack of a fuel cell according to an exemplary embodiment of present invention.

Additionally, the term fluid may be interpreted as air, water, refrigerant or any other known fluid which may be used for cooling purposes. In the exemplary embodiments of the present invention water is preferably used, however, the FIG. 2 is a view showing a protrusion 22 arranged on an end plate 20 at a stack of a fuel cell 10 according to an exemplary embodiment of the present invention, FIG. 3 is aside view showing an end plate 20 of FIG. 2, and FIG. 4 is a view to describe a flow of cooling fluid by means of the protrusion 22 at the stack of a fuel cell 10 according to the exemplary embodiment of the present invention. In particular, the apparatus for preventing over-cooling of a fuel cell according to the present invention includes mainly a cooling fluid manifold 30, the end plate 20 and at least one protrusion 22. However, it will be understood that multiple protrusions may be added to further reduce the flow dependent upon the specifications of the fuel cell stack.

In more detail, referring to FIGS. 2 to 4, the apparatus for preventing over-cooling of a fuel cell includes: the cooling fluid manifold 30 which is formed in the fuel cells of the stack of the fuel cell 10 and through which cooling fluid flows therethrough; the end plates 20 that are arranged on both ends of the stack of the fuel cell 10; and the at least one protrusion 22 that is provided on one surface of the end plate 20 and is disposed inside the cooling fluid manifold 30 to reduce the flow amount of the cooling fluid which flows in and out between the separating plates 12a, 12b through the cooling fluid manifold 30.

Here, the cells participating in power generation in the stack 10 (general cells, and end cells) may include an MEA, GDLs (Gas Diffusion Layers), an anode separating plate 12a, a cathode separating plate 12b, and a gasket, etc. Further, the endplate 20 on which the at least one protrusion 22 is formed may be shaped so as to not have any apertures or holes for gas or the cooling fluid manifold 30. And further, the separating plates 12a, 12b may be the anode separating plate 12a and the cathode separating plate 12b to be used separately or used by being bonded together.

That is, the protrusion 22 may be arranged on a surface facing the cooling fluid manifold 30 so as to protrude out from both surfaces of the end plate 20, and the protrusion 22 may be disposed within or at the cooling fluid manifold 30, thereby reducing the flow amount of the cooling fluid which flows between the separating plates 12a, 12b from the cooling fluid manifold 30 to cool the end cell. Accordingly, the flow amount of the cooling fluid which flows between the separating plates 12a, 12b from an outer circumference of the end cell facing the end plate 20 is reduced, thereby avoiding an excessive cooling of the end cell, and as a result, a deterioration of a cell may be prevented by avoiding a flooding phenomenon of a fuel cell.

Meanwhile, in an apparatus for preventing over-cooling of a fuel cell of the present invention, the at least one protrusion 22 may be shaped to be fitted to the inside of the cooling fluid manifold 30 to block a part of a flow channel of cooling fluid 14 that is arranged between the separating plates 12a, 12b. That is, a sectional area of the flow channel of the cooling fluid 14 formed between the separating plates 12a, 12b may be reduced by adjusting the height of the protrusion 22 being fitted into the cooling fluid manifold 30. As a result, the height of the protrusion 22 may be adjusted such that the flow amount of the cooling fluid which flows towards an outer circumference of the end cell is approximately half of the flow amount of the cooling fluid which flows through a general cell, with a flow analysis of the cooling fluid and so on. As a result, if necessary, the flow amount of the cooling fluid which flows between the separating plates 12a, 12b can be adjusted through the height of the at least one protrusion 22.

Additionally, in some exemplary embodiments of the present invention the at least one protrusion 22 may be shaped to correspond to a section of the cooling fluid manifold 30. That is, in a process of stacking the stack 10, cells are stacked sequentially and the end plate 20 is put finally thereon, and at this time, when a protrusion 22 shaped to be identical to the section of the cooling fluid manifold 30 of the end plate 20 is formed thereon, the protrusion 22 serves additionally as a stacking alignment tool, thereby improving the productivity of the stack 10.

Furthermore, in some exemplary embodiments of the present invention, the protrusion 22 may be provided on at least one side of an inlet and an outlet 34 of the cooling fluid manifold 30. That is, the flow of the cooling fluid which is discharged towards the flow channel of the cooling fluid 14 between the separating plates 12a, 12b may be adjusted at a side of the inlet of the cooling fluid manifold 30. Further, the flow of the cooling fluid which is flowed in towards a side of the outlet 34 of the cooling fluid manifold 30 at the flow channel of cooling fluid 14 may be adjusted.

Additionally, the at least one protrusion 22 may be formed integrally with the end plate 20. That is, the end plate 20 may be formed simultaneously with the protrusion 22 with affecting the shape of the protrusion when injecting an envelope of the end plate, and thus a method or a structure for manufacturing the protrusion 22 on the end plate 20 will not become complex.

Figure 5:
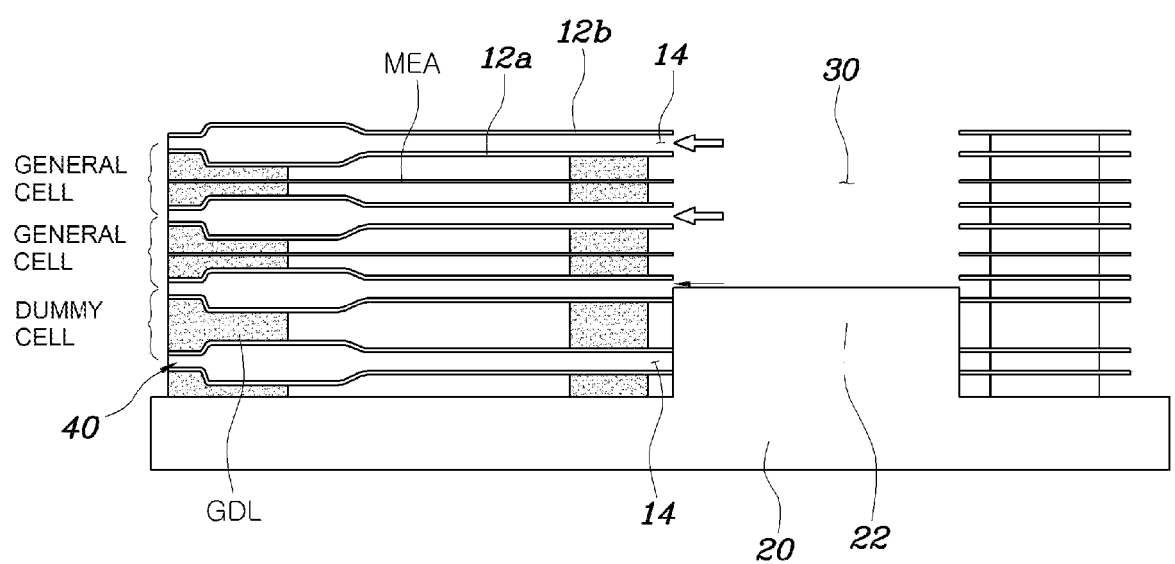
FIG. 5 is a view showing a configuration at a stack of a fuel cell according to an exemplary embodiment of present invention to which a dummy cell is added.

Meanwhile, as shown in FIG. 5, a dummy cell 40 not participating in power generation (cell having no MEA and performing electric conduction only) may be arranged additionally between the end plate 20 and general cells that participates in power generation in order to discharge smoothly condensation fluid at a portion facing the end plate 20. In this case, the cooling fluid does not substantially flow towards the dummy cells 40 and thus an effect of heat insulation is ensured by itself, thereby reducing heat transfer to the outside through the end plate 20.

According to the apparatus for preventing over-cooling of a fuel cell of the exemplary embodiment of the present invention, a protrusion is fitted into a cooling fluid manifold formed at an end plate to block a portion of a flow channel of the cooling fluid which flows between separating plates, thereby reducing flow amount of the cooling fluid which flows between the separate plates in order to cool the end cell. Accordingly, the flow amount of the cooling fluid which flows between separating plates at an outer circumference of an end cell facing the end plate can be easily reduced, thereby avoiding an excessive cooling of the end cell, and as a result, deterioration in a cell can be prevented by avoiding a flooding phenomenon of a fuel cell.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. An apparatus for preventing over-cooling of a plurality of fuel cells, comprising:
   a cooling fluid manifold formed in the fuel cells of a stack of the fuel cells and through which cooling fluid flows therethrough;
   end plates that are arranged on both ends of the stack of the fuel cells; and
   at least one protrusion that is provided to be protruded outward by a preset length on one surface of each of the end plates and are disposed at the end of the cooling fluid manifold to reduce the flow amount of only the cooling fluid which flows in and out between separating plates adjacent to the end plates through the cooling fluid manifold.

2. The apparatus for preventing over-cooling of a fuel cell of claim 1, wherein the at least one protrusion is fitted to an inside of the cooling fluid manifold to block a portion of a flow channel of the cooling fluid that is formed between the separating plates.

3. The apparatus for preventing over-cooling of a fuel cell of claim 1, wherein the at least one protrusion is shaped to correspond to a section of the cooling fluid manifold.

4. The apparatus for preventing over-cooling of a fuel cell of claim 1, wherein the at least one protrusion is installed on at least one side of an inlet and an outlet of the cooling fluid manifold.

5. The apparatus for preventing over-cooling of a fuel cell of claim 1, wherein the at least one protrusion is formed integrally with the end plate.

6. The apparatus for preventing over-cooling of a fuel cell of claim 1, further comprising a dummy cell not participating in power generation, which is arranged at a portion facing the end plate.

7. The apparatus for preventing over-cooling of a fuel cell of claim 1, wherein the cooling fluid is water.

8. A fuel cell vehicle comprising:
   a fuel cell stack having a plurality of fuel cells;
   a cooling fluid manifold formed in the fuel cells of the fuel cell stack and through which cooling fluid flows therethrough;
   end plates that are arranged on both ends of the stack of the fuel cell; and
   at least one protrusion that is provided to be protruded outward by a preset length on one surface of each of the end plates and are disposed at the end of the cooling fluid manifold to reduce only the flow amount of the cooling fluid which flows in and out between separating plates adjacent to the end plates through the cooling fluid manifold.

9. The fuel cell vehicle of claim 8, wherein the at least one protrusion is fitted to an inside of the cooling fluid manifold to block a portion of a flow channel of the cooling fluid that is formed between the separating plates.

10. The fuel cell vehicle of claim 8, wherein the at least one protrusion is shaped to correspond to a section of the cooling fluid manifold.

11. The fuel cell vehicle of claim 8, wherein the at least one protrusion is installed on at least one side of an inlet and an outlet of the cooling fluid manifold.

12. The fuel cell vehicle of claim 8, wherein the at least one protrusion is formed integrally with the end plate.

13. The fuel cell vehicle of claim 8, further comprising a dummy cell not participating in power generation, which is arranged at a portion facing the end plate.

14. The fuel cell vehicle of claim 8, wherein the cooling fluid is water.

* * * * *